(12) United States Patent
Angelella et al.

(10) Patent No.: US 8,242,403 B2
(45) Date of Patent: Aug. 14, 2012

(54) WIRE ELECTRIC DISCHARGE MACHINING METHOD AND APPARATUS

(75) Inventors: Stefano Angelella, Quartino (CH); Livio Mazzolini, Ponte Capriasca (CH); Stefano Candolfi, Locarno (CH)

(73) Assignees: Agie Charmilles SA, Losone (CH); Charmilles Technologies SA, Meyrin (CH)

( * ) Notice: Subject to any disclaimer, the term of this patent is extended or adjusted under 35 U.S.C. 154(b) by 436 days.

(21) Appl. No.: 12/688,245

(22) Filed: Jan. 15, 2010

(65) Prior Publication Data
US 2010/0187204 A1    Jul. 29, 2010

(30) Foreign Application Priority Data
Jan. 29, 2009  (EP) .................................. 09001260

(51) Int. Cl.
*B23H 1/00*    (2006.01)
(52) U.S. Cl. ................ 219/69.12; 219/69.13; 219/69.17
(58) Field of Classification Search .................. None
See application file for complete search history.

(56) References Cited

U.S. PATENT DOCUMENTS

| | | | | |
|---|---|---|---|---|
| 5,438,178 A | * | 8/1995 | Buhler et al. | 219/69.12 |
| 5,852,268 A | * | 12/1998 | Buhler et al. | 219/69.12 |
| 6,252,191 B1 | * | 6/2001 | D'Amario | 219/69.13 |
| 6,320,151 B1 | * | 11/2001 | Angelella et al. | 219/69.12 |

FOREIGN PATENT DOCUMENTS

| | | |
|---|---|---|
| DE | 42 22 186 | 1/1994 |
| EP | 1 769 871 | 4/2007 |
| JP | 06 143037 | 5/1994 |

* cited by examiner

*Primary Examiner* — David E Graybill
(74) *Attorney, Agent, or Firm* — Harness, Dickey & Pierce, P.L.C.

(57) ABSTRACT

A method for controlling a wire electric discharge machine comprising the steps of:

determining of at least one predefined contour deviation ($E_{smax}$) of a predefined contour to be cut into the workpiece;

determining a curvature of at least one geometry element defining at least one section of the contour to be cut into the workpiece;

calculating a displacement (s) of an upper guide ($WG_U$) and a lower wire guide ($WG_L$) based on the predefined contour deviation ($E_{smax}$) and on the curvature of the at least one predefined geometry element; and setting the displacement (s) by moving the upper guide ($WG_U$) relative to the lower wire guide ($WG_L$) such that the wire electrode guided by the upper ($WG_U$) and lower wire guides ($WG_L$) is inclined in a current cutting direction of the workpiece during cutting of the geometry element into the workpiece.

13 Claims, 11 Drawing Sheets

WIRE ELECTRIC DISCHARGE MACHINING METHOD AND APPARATUS

CROSS-REFERENCE TO RELATED APPLICATION

This application claims the benefit of European Patent Application No. 09 001 260.0, filed on Jan. 29, 2009, the entire disclosure of which is incorporated herein by reference.

FIELD OF THE INVENTION

The present invention relates to a method for controlling a wire electric discharge machining process and to a wire electric discharge machining apparatus.

BACKGROUND OF THE INVENTION

Wire electric discharge machining (WEDM), is an extremely versatile and accurate machining process. A desired contour is cut in a workpiece by means of a wire electrode (wire). Wire and workpiece are moved relatively to each other according the instructions of a machining program. The workpiece material is removed by the action of electrical discharge pulses applied between wire and workpiece.

High-End WEDM achieve shape accuracy below 1 µm and surface roughness below Ra 0.05 µm. These results are achieved by releasing discharge pulses of very low energy. The overall machining accuracy is determined by the sum of all error components. It is desirable that errors which were tolerated in the past should behenceforth taken into account. In WEDMing the engagement of tool and workpiece, disregarding drag error, oscillations of the wire, wire wear, etc., is essentially linear.

With certain workpiece materials, working conditions, etc., it may happen that the wire leaves some cutting marks extending vertically on the machined surface. The cutting marks occur in the form of protruding ridges and grooves. There are various causes for the occurrence of cutting marks. Sometimes the protruding ridges are due to inhomogeneities of the workpiece material, in particular inclusions, f.i. slag particles, oxides, etc, being much less conductive than the base material.

As shown in FIG. 1, local material defects cause remarkable isolated protruding ridges. Sometimes, the cutting marks are caused by sudden detachment of abrasion debris, such as the comparably soft wire coating material accumulated at a upper current supply or at a wire guide. Due to these local defects the wire may deviate laterally by a small amount, but large enough to leave a cutting mark in the wire traveling direction. Sometimes the cutting marks are visible to the naked eye, and are therefore highly undesirable. Stopping and restarting of the WEDM process, f.i. in case of electrical power outage, is another cause of cutting marks.

Difficult working conditions or improper settings are other causes of cutting marks. Here, in most cases the protruding ridges and grooves are present over the whole machining surface or over an entire side of the workpiece, as shown in FIG. 2. These cutting marks are much smaller than the mostly isolated protruding ridges caused by material defects. The energy of the discharge pulses is lowered in each successive cut, so that it is sometimes difficult to remove cutting mark with conventional methods.

DE 42 22 186 C2 of BÜHLER suggests to slightly tilt the wire in the cutting direction when producing finishing cuts along straight or only slightly curved sections (see also U.S. Pat. No. 5,438,178 family member of BÜHLER, e.g. FIG. 4; description, col.5, ln.67-col.6, ln.22; claim 4). One of the upper and the lower wire guide anticipates the other wire guide, which causes a slight lag between an upper and a lower machining path. Since WEDM is often executed in a main and one or more trim cuts, the wire electrode is guided along the machining path under varying angles in consecutive cuts. In this way, cutting marks are at least partially removed—surface smoothing is achieved.

Also, BÜHLER provides information about the shifting amount between upper and lower wire guide, so as to obtain a good smoothing. However, BÜHLER does not disclose how and under which circumstances the method could be implemented in practice, and in particular how it could be implement in corners and arc sections of large curvature.

An object of the present invention is to provide an improved method for controlling a WEDM process and an improved wire electric discharge machining apparatus.

SUMMARY OF THE INVENTION

According to a first aspect, the invention provides a method for controlling a wire electric discharge machine comprising the steps of: determining of at least one predefined contour deviation of a predefined contour to be cut into the workpiece; determining a curvature of at least one geometry element defining at least one section of the contour to be cut into the workpiece; calculating a displacement of an upper guide and a lower wire guide based on the predefined contour deviation and on the curvature of the at least one predefined geometry element; and setting the displacement by moving the upper guide relative to the lower wire guide such that the wire electrode guided by the upper and lower wire guides is inclined in a current cutting direction of the workpiece during cutting of the geometry element into the workpiece.

According to a second aspect, the invention provides a wire electric discharge machining apparatus, comprising: a controller for controlling the cutting of a contour comprising at least one geometry element into a workpiece; a wire electrode and an upper wire guide and a lower wire guide for guiding the wire electrode, the upper wire guide and the lower wire guide being controllable by the controller; wherein the controller is adapted to perform the method according to the first aspect.

Further aspects of the invention are set forth in the dependent claims, the following description and the drawings.

BRIEF DESCRIPTION OF THE DRAWINGS

Embodiments of the present invention are explained by way of example with respect to the accompanying drawings, in which:

FIG. 3b further illustrates the smoothing of the surface of FIG. 3a;

FIGS. 4b to 4d Illustrate the effect of a smoothing method of the surface shown in FIG. 4a;

DETAILED DESCRIPTION OF EMBODIMENTS

Figure 17:
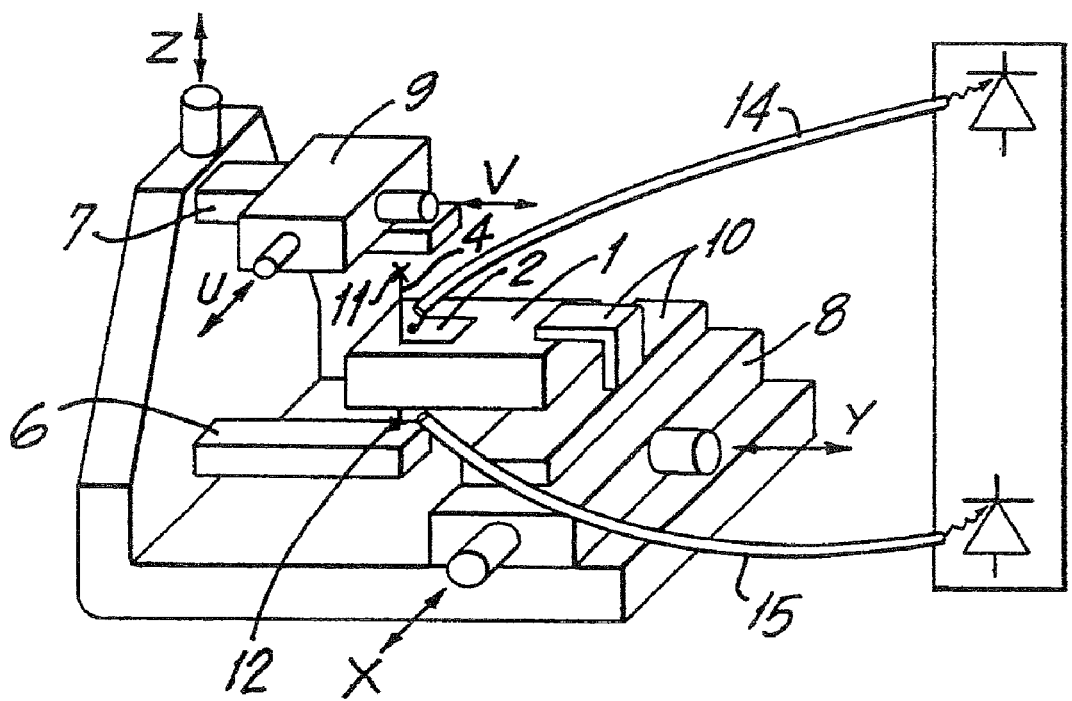
FIG. 17 illustrates a wire electric discharge machining apparatus in accordance with an embodiment of the present invention.

FIG. 17 illustrates an embodiment of the wire electric discharge machining apparatus. Before proceeding further with the detailed description of FIG. 17, however, a few general items will be discussed.

As already mentioned in the introduction part, the prior art document BÜHLER does not disclose how the inclination of the wire electrode and the resulting surface smoothing can be conducted, e.g. in curved geometry elements of a contour to be cut into a workpiece.

It has been recognized that, if the geometric conditions are not duly considered, the implementation of the method can entail more damage than benefit. Using the smoothing method indiscriminately in any section of a machining path, i.e. of a contour to be cut into the workpiece, could cause undefined shape errors, which result from the deviation between the contour which should be cut into the workpiece and the contour which is really cut into the workpiece. For instance, in contour sections with fine details and in sharp corner sections, tilting the wire in the cutting direction causes inadmissible shape errors, in particular a vertical straightness error.

By keeping the wire tilted (inclined) in the cutting direction within a curved section the vertical shape becomes concave in outer curves and convex in inner curves, respectively. From a purely geometrical point of view, a cross-section orthogonal to the cutting direction in curved path sections shows a hyperbola instead of a line. The contour error or contour deviation depends on the radius of the curved section and on the lag or displacement between the upper and lower machining path which is given by the wire tilt angle.

In other words, it has been recognized that there exists a tradeoff between the displacement of the upper and lower machining path and the contour error. When controlling a wire electric discharge machine or wire electric discharge machining process of a workpiece, this tradeoff between the inclination of the wire electrode for surface smoothing and the resulting contour error can be used to set an "optimal", i.e. maximal admissible, inclination for the wire electrode which results in an admissible contour or shape error.

In some embodiments, at least one contour deviation of a predefined contour to be cut into the workpiece is determined. As already mentioned, the contour deviation (or contour/shape error) is the deviation between the contour which should be cut into the workpiece and the contour which is really cut into the workpiece. This contour deviation is produced by the inclination of the wire electrode and is the deviation from the contour which would be cut in the case of a non-inclined, i.e. vertical, wire electrode. This (admissible) deviation can be predefined, for example, by a user. Other errors may result in a additional contour deviation, such as errors which have their origin in the control of other parameters of the wire electrode, e.g. ignition voltage, discharge current, etc.

The contour which should be cut into the workpiece comprises at least one geometry element. A geometry element is a section of the contour with a certain shape, e.g. a line, an arc, a corner, etc.

A t next, a curvature of at least one geometry element defining at least one section of the contour to be cut into the workpiece is determined. Thus, at this stage the information for determining the "optimal" inclination is known: the admissible contour error and the curvature of the geometry element.

Then, a displacement of an upper guide and a lower wire guide based on the predefined contour deviation and on the curvature of the at least one predefined geometry element is calculated. By displacing the upper and lower wire guide, the electrode wire is inclined, i.e. it is moved out of its vertical direction and the electrode wire builds a tilt or inclination angle with respect to its vertical position. For instance, the upper and lower wire guides are positioned above and below the workpiece, respectively, and guide the wire electrode along its way through the workpiece. The displacement is set by moving the upper guide relative to the lower wire guide such that the wire electrode guided by the upper and lower wire guides is inclined in a current cutting direction of the workpiece during cutting of the geometry element into the workpiece. The relative movement between the upper and the lower wire guides can be conducted, for example, by moving the upper wire guide, the lower wire guide or both the upper and the lower wire guide.

By inclining or tilting the wire (electrode) in the cutting direction the smoothing of the cut surface of the workpiece can be achieved. The smoothing of cutting marks, such as ridges or other structures protruding from the surface of the workpiece, is enhanced with an inclined wire electrode, since due to the inclination of the wire the time of contact between the wire electrode and the cutting mark is prolonged. Thus, the wire electrode engages the cutting marks for a longer time and, thus, enhances the smoothing of the cutting marks.

For instance, the wire can be tilted at an angle γ by moving the upper wire guide ($WG_U$) and lower wire guide ($WG_L$) relative to each other so as to cause a displacement (s) at the workpiece level. This is accomplished, e.g. by keeping the lower wire guide $WG_L$ stationary while moving an X/Y cross table carrying the workpiece and by moving the upper wire guide by means of an U/V cross table.

In general, the X/Y plane is basically parallel to earth's surface and the X/Y cross table is adapted to move the workpiece, which is mounted on it, within this X/Y plane. The U/V cross table is adapted, for example, to move the upper wire guide relative to the lower wire guide such that the wire can be inclined in different directions, such as parallel to the cutting direction or also in an angle with respect to the cutting direction.

An upper point ($P_U$) and a lower point ($P_L$) are, for example, the intersection points of the wire axis with the top and bottom surface of the workpiece, respectively. The displacement s can be regarded as the segment projected in the X/Y plane of the distance between such an upper point $P_U$ and lower point $P_L$. Thus, in this case the displacement depends also on the height (thickness) of the workpiece.

Summarising, the displacement can be measured at different points: e.g. it can be regarded as the displacement between the upper and lower wire guides or it can be regarded as the segment projected in the X/Y plane of the distance between the above upper and lower intersection points. However, both displacements are set by moving the upper and/or lower wire guide relative to each other and both displacements can be easily converted into one another, since they are proportional to each other. In other words, both displacements are "interchangeable" and in the following it is not differentiated between them.

When the surface smoothing is activated, for example, a control unit of an electric discharge machining apparatus tilts the wire in the cutting direction according to several rules, as described later on. The initially vertical wire is tilted in a wire cutting direction to the maximum allowable tilt angle and maintained at said angle, as long as the curvature of the successive geometry element does not impose to reduce the inclination or to reset the wire to the vertical position. The inclination of the wire can be changed, for example, by moving the upper and lower wire guide ($WG_U$, $WG_L$) at different speed while cutting. For instance, the wire guides are moved such that the path speed at the top surface is higher than the path speed at the bottom surface of the workpiece in some embodiments.

The surface smoothing method is generally used in some embodiments in the finish machining steps, and may f.i. comprise one or more trim cuts with varying tilt angle and/or cutting direction. However, the surface smoothing method may already be used with the main cut.

Experiments have shown that a comparably small inclination of the wire in the order of 0.5° leads to a notable reduction of the roughness in wire cutting direction (Ra⊥). The roughness can be further reduced with a slightly higher inclination, but to the disadvantage of the shape accuracy, accordingly the beneficial inclination angle is around 0.5°-1°.

It is typical for WEDM that the roughness in wire cutting direction (Ra⊥) is lower than the roughness in wire feeding direction (Ra=). In some embodiments, the roughness in wire feeding direction (Ra=) remains substantially unaffected by the present surface smoothing method. Since the roughness in wire feeding direction (Ra=) approaches the roughness in wire cutting direction (Ra⊥), the ratio of Ra=/Ra⊥ is enhanced in some embodiments. In this way the WEDM typical topography can even be less apparent.

To avoid that the contour deviation exceeds a specific value the calculated displacement is compared with a predefined maximal displacement. In the case that the calculated displacement is greater than the maximal allowed displacement, the displacement is set to the maximal displacement.

In some embodiments, a maximal displacement for a current geometry element is calculated based on the predefined contour deviation and the curvature of the current geometry element. As mentioned above, the displacement is achieved by moving the upper and lower wire guides relative to each other. This movement can be performed before cutting a current geometry element or within cutting a current geometry element. By calculating a maximal displacement it is possible, to set this maximal displacement before cutting the current geometry element and, for example, to keep it constant until the cutting of the current geometry is completed.

The geometry element can be further divided into sections, for example in a beginning section or start section, a middle section and an end section. Thus, the displacement can be calculated for an end section of the current geometry element. At next the maximal displacement for the following geometry element is calculated. By setting the displacement such that it does not exceed the maximal displacement for the following geometry element a smooth transition between the current geometry element and the following geometry element is possible. As mentioned above, the contour comprises different geometry elements which can be different. Thus, there exists a transition from one (current) geometry element to another (following) geometry element. By determining the (current) displacement for the end section of the current geometry element and the maximal displacement for the following geometry displacement, the displacement can be set to, e.g. the same value.

There exist several embodiments to vary the displacement in the transition from one geometry element to the next geometry element.

For example, in some embodiments the displacement is continuously reduced, in an end section of the geometry element, to the maximal displacement for the following geometry element, in the case that the maximal displacement for the current geometry element exceeds the maximal displacement for the following geometry element.

In other embodiments, the displacement is reduced to zero at the end of each geometry element, i.e. at the transition of one (current) to another (following) geometry element.

It is also possible to set a displacement for two adjacent geometry elements. In this case, there is no need to vary the displacement at the transition from the one to the other geometry element. For instance, the displacement can be set to the smallest maximal displacement of the at least two adjacent geometry elements for the at least two adjacent geometry elements. Of course, it is also possible to take more than two geometry elements into account.

In some embodiments the displacement for the beginning of the current geometry element is continuously increased to the maximal displacement for the current geometry element.

As mentioned above, in cases where the radius (R) of curvature is very small or the curvature (K), which is the reciprocal of the radius of curvature, is very large, the contour deviation might become too large. Such conditions can also arise in corner elements, which build, for example, basically a perpendicular angle. Thus, in some embodiments, the displacement is continuously reduced to zero, in the case that the radius of curvature of a following geometry element is equal to or lower than a predefined minimal radius of curvature or in the case that the transition of the current geometry element to the following geometry element comprises a corner element.

Another possibility to set the displacement at the transition from one geometry element to another geometry element is to insert another cutting or non-cutting movement, at the transition, in which the displacement is set to the new value for the next geometry element. For instance, at least one loop-movement is inserted in the transition of a current geometry element to a following geometry element and the displacement for the following geometry element is set during this loop-movement. The loop movement does not necessarily comprise an arc or round element, but it can also be triangular, or elliptical, etc. The loop-movement provides the possibility to set the displacement to a new value, and all shapes for the loop-movement providing this possibility can be chosen.

As mentioned above, in some embodiments the wire electrode cutting the contour into the workpiece builds an upper contour point ($P_U$) on the upper surface of the workpiece and a lower contour point ($P_L$) on the lower surface of the workpiece. In such embodiments each variation of the displacement (s) can be adjusted by at least one of slowing and stopping of the velocity of the upper contour point ($P_U$) and/or the lower contour point ($P_L$).

To further improve the smoothing of the surface, the direction of inclination of the wire electrode can be reversed for successive trim cuts of the workpiece. In some embodiments at least a main cut of the workpiece is performed without inclining the wire electrode in the cutting direction, while the wire electrode is inclined in successive trim cuts.

In some embodiments, a wire electric discharge machining apparatus typically comprises a controller for controlling the cutting of a contour comprising at least one geometry element into a workpiece and a wire electrode. An upper wire guide and a lower wire guide are adapted to guide and to position the wire electrode, for example to incline the wire electrode in the cutting direction. The controller controls the upper and lower wire guides and the controller is also adapted to perform any one of the methods as explained above.

Returning to FIG. 17, a wire electric discharge machining (WEDM) apparatus comprises a lower arm 6 and an upper arm 7 for guiding a wire electrode 4. The wire electrode 4 runs through a workpiece 1, hold by a workholder 10, and cuts out a cutting work 2. An X-Y cross table 9 moves the workpiece 1 in the X- and Y-direction and thereby cuts a specific form into the blank 1. An U-V cross table 9 is adapted to move the wire electrode via an upper wire guide 11 relative to an lower wire guide 12. The wire electrode 4 is inclined by moving the upper wire guide 11 in the U/V-direction, for example, in the cutting direction. To control the correct offset of the wire electrode 4 from the work 2, an upper photodetector 14 and a lower photodetector 15 detect the brightness of the discharge in the vicinity of operations above and below the work 2.

In general, the work 2 is cut out by one or more successive cuts, e.g. by a (rough) main cut and several (precision) trim cuts. In some cases, as mentioned above, the surface of the work 2 will show cuttings marks even after performing the trim cuts. By inclining the work electrode 4 with the U-V cross table 9 in the cutting direction, the surface of the work 2 is smoothed, since the wire electrode 4 smoothes the cutting mark in an angle and, thus, remains longer in contact with each cutting mark.

The surface smoothing effect and methods for performing the smoothing are explained in detail as follows:

By slightly tilting the wire in the cutting direction in successive cuts, a cutting mark generated in a first cut is not engaged "at once" in the successive cut. The engagement of the wire with the cutting mark can be represented as the intersection of two segments, i.e. the wire engages only a small portion of the cutting mark at once. Thus surface smoothing is due to a leveling effect. In some embodiments, the surface smoothing is particularly effective with protruding ridges, because these ridges are particularly exposed to the action of the spark discharges.

Figure 1:
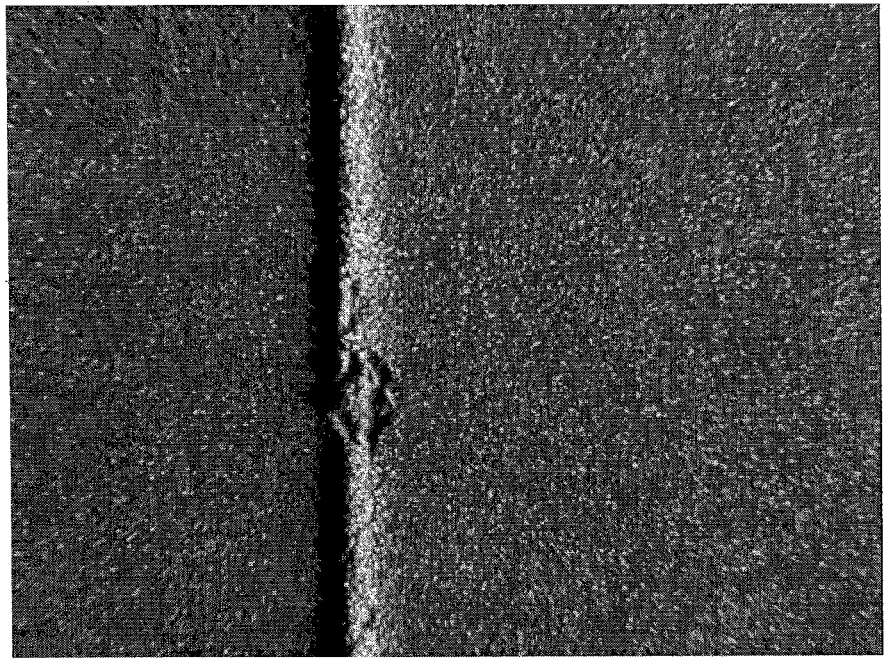
FIG. 1 shows a protruding ridge on a surface of a workpiece after cutting.
Figure 2:
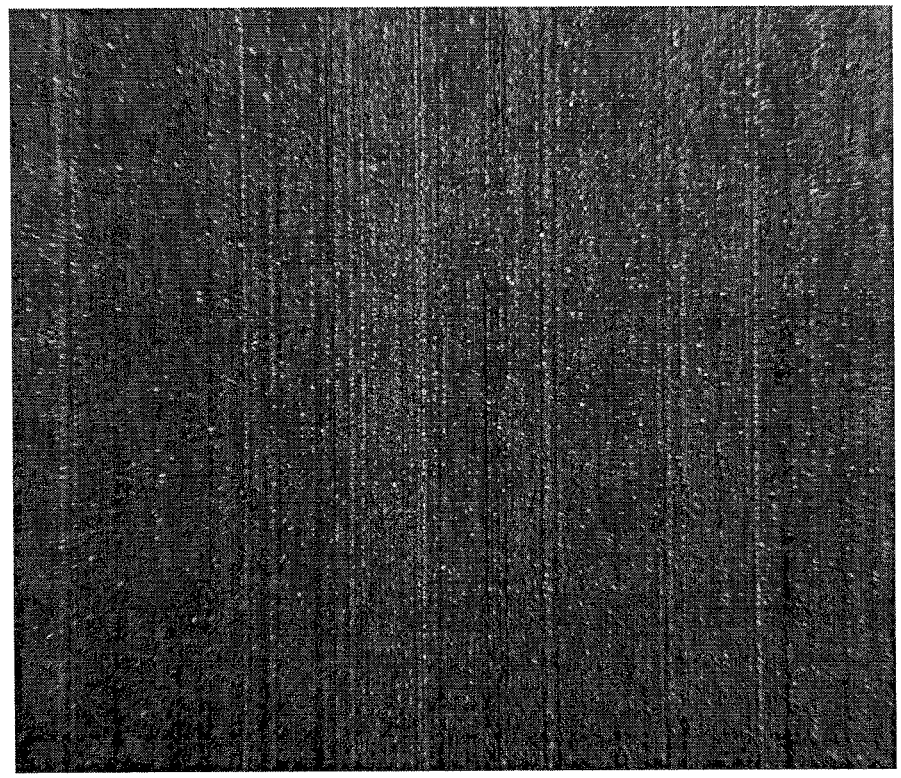
FIG. 2 shows a plurality of protruding ridges and grooves on a surface of a workpiece after cutting.
Figure 3A:
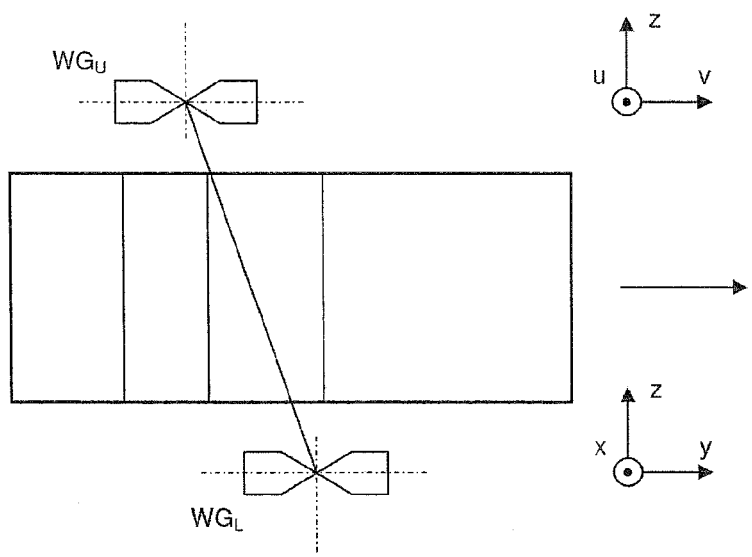
FIG. 3a illustrates an embodiment of a method for smoothing of the surface of a workpiece.
Figure 3B:
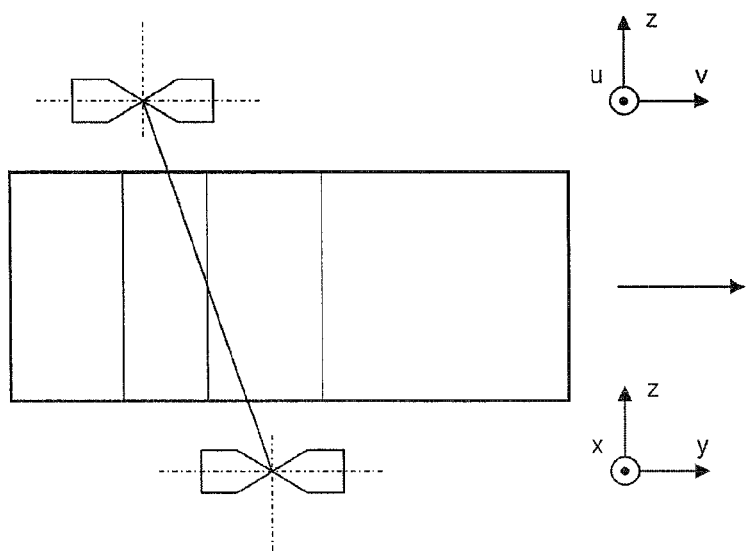

FIGS. 3a and 3b show a workpiece having cutting marks, during a trim cut operation. For the sake of simplicity only 3 cutting marks are represented. The wire is guided by an upper and a lower wire guide $WG_U$ and $WG_L$. The wire engages the cutting mark from the top to the bottom. In FIG. 3a the wire encounters a cutting mark, while in FIG. 3b about half of the cutting mark has been crossed.

Figure 4A:
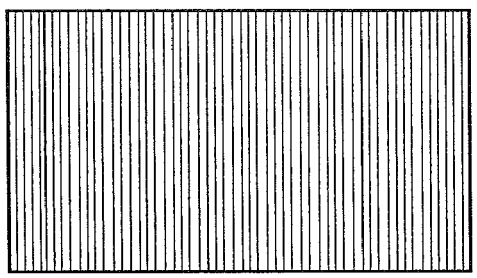
FIG. 4a illustrates protruding ridges on a surface of a workpiece after cutting.
Figure 4B:
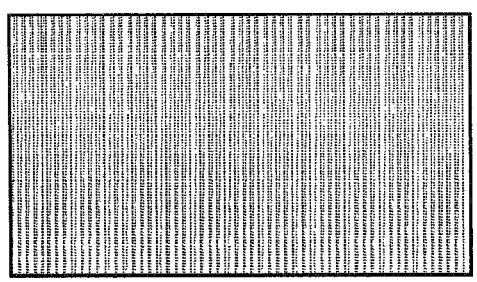
Figure 4C:
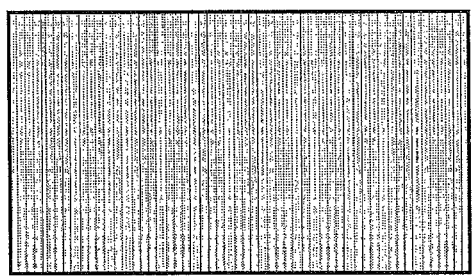
Figure 4D:
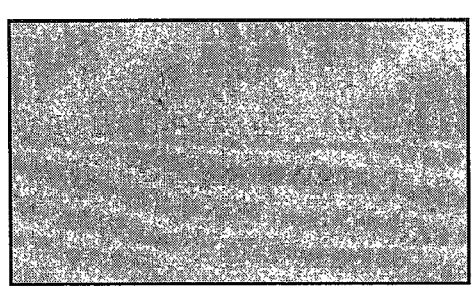

FIG. 4a shows the surface of a workpiece after a main cut, whereas the workpiece has cutting marks extending vertically over the entire surface. The workpiece is successively subject to several trim cuts with progressively lower pulse energy and lower working gap distances, so as to achieve the desired quality of the surface (FIG. 4b-4d).

As explained above and illustrated in FIG. 6, in some embodiments, the present surface smoothing method implies a deviation from the predefined contour, called shape error $E_s$, in curved path sections, caused by the lag between the upper and the lower wire guide. This shape error $E_s$ occurs, since in curved path sections it is not possible to have the upper point $P_U$, a lower point $P_L$ and an intermediate point all matching the nominal machining path, when the wire is tilted in the cutting direction. The shape error $E_s$ is proportional to the curvature of a geometry element and proportional to the displacement s, which is, for example, the displacement of the upper point $P_U$ and the lower Point $P_L$. The radius of each geometry element is extracted from the machining program, whereas a maximum permissible value of the shape error $E_{smax}$ is defined, e.g. by the user and stored in a memory of a control unit of the WEDM apparatus. The maximum permissible value of the shape error $E_{smax}$ is used to compute the displacement s in curved sections.

For typical WEDM application the maximum permissible shape error $E_{smax}$ may be around 1 µm, but when the preference is on high shape accuracy, the maximum permissible shape error $E_{smax}$ should be well below 1 µm. The control unit provides a default value of the maximum permissible shape error $E_{smax}$, and may be designed so as to accept only input values of $E_{smax}$ within a certain range, f.i. below 3 µm. Such comparably large values may be acceptable when only the appearance is to be enhanced. Alternatively, the control unit may automatically generate a maximum permissible value of the shape error $E_{smax}$ considering the size of the machining, the size of the smallest features of the contour, (i.e. radii, fillet sizes, etc.) and/or other quality target values.

In some embodiments, $E_{smax}$ specifies only the maximum permissible value of the shape error allowed in curved sections by the present smoothing method. It is understood that said value may also be derived on the basis of a default or user-defined overall permissible contour error $E_{kmax}$, embracing all causes of shape error, or from another parameter specifying the desired accuracy.

The control unit may also provide a default value for the maximum tilt angle $\gamma_{Smax}$, or prompt the user to input said value. Since tilt angle $\gamma$ and displacement s are interrelated, the maximum displacement $s_{max}$ can be computed based on the value of maximum tilt angle $\gamma_{Smax}$ and based on the height of the workpiece $H_w$, $$s=\tan(\gamma)*H_w$$

$$s_{max}=\tan(\gamma_{smax})*H_w$$

In a straight machining path, i.e. without curves, once the wire is tilted in the cutting direction ($\gamma$=constant, curvature K=0, with K=1/R and R=∞) the present smoothing method does not cause shape errors, i.e. concave or convex surfaces.

The displacement s must eventually be reduced within a straight machining section to avoid discontinuities at the transition from the current geometry element to the successive geometry element. For instance, in view of a sharp corner the wire is reset such as to reach the corner in the vertical position, thus redressing of the wire in initiated within the current geometry element.

In a curved machining path (curvature K≠0), the present smoothing method causes a certain shape error $E_s$. Thus, the displacement s must be set in function of the permissible shape error $E_{smax}$ and in function of the radius of the current geometry element. Further, as explained for the case of a straight machining, the displacement s is eventually reduced in function of the curvature of successive geometry elements, so as to avoid discontinuities at the transition from the current to the next geometry element.

In the general case the instantaneous displacement s is computed as a function of the maximum tilt angle value $\gamma_{Smax}$ or the maximum displacement $s_{max}$, the maximum permissible shape error $E_{smax}$, as well as the curvature K of the current and successive geometry elements.

In some embodiments, the control unit provides a default value of the minimum smoothing radius $R_{Smin}$, to exclude the surface smoothing method in sharp corners and small radii. The control unit provides a default value of the maximum permissible shape error $E_{smax}$, and may be designed so as to accept only input values of $R_{Smin}$ within a certain range, f.i. below 5 mm. A typical minimum smoothing radius $R_{Smin}$ may be 1 mm. This value could be defined in function of the size of the machining, of the performance of the WEDM, of the used wire diameter, or another parameter.

Once the displacement s is known, the movement of the upper and lower wire guide $WG_U$, $WG_L$ is computed by means of the rule of proportion, considering the height of the workpiece $H_W$, the distance of the upper wire guide $WG_U$ from the top of the workpiece and the distance of the lower wire guide $WG_L$ from the bottom of the workpiece.

In the following the radius R is intended as the radius of the geometry element including the offset value. The radius of the geometry element is defined by the machining program. The offset value, i.e. the distance (+ or −) between the axis of the wire and the desired geometry of the workpiece is defined in an offset table for every machining step (main cut and trim cuts).

There are several options realized in several embodiments on how to tilt the wire relative to the programmed machining path.

Figure 6:
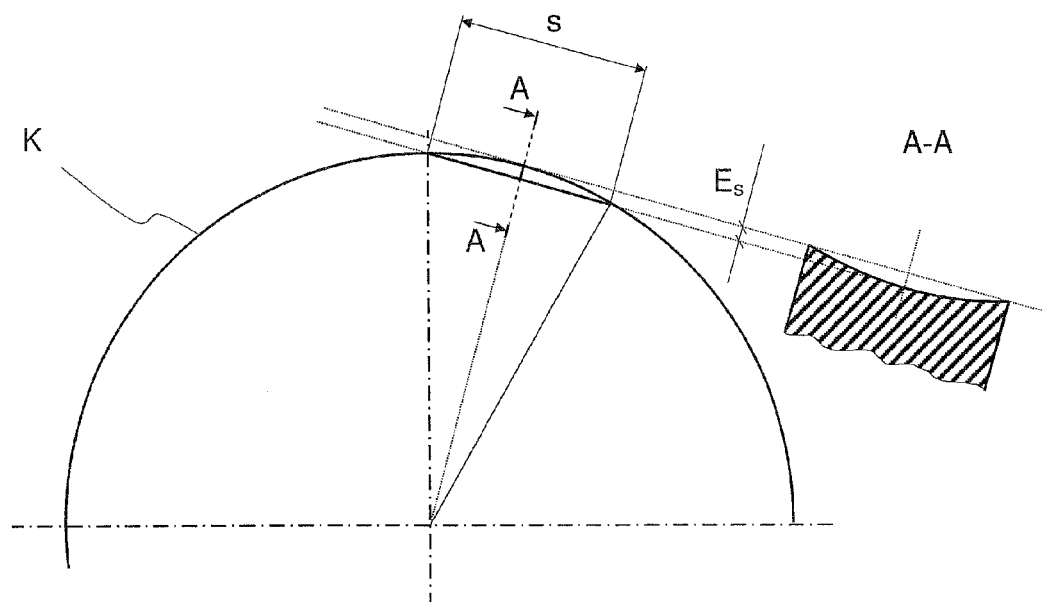
FIG. 6 illustrates a contour deviation which occurs when the wire electrode is inclined and a curved contour is cut.
Figure 7A:
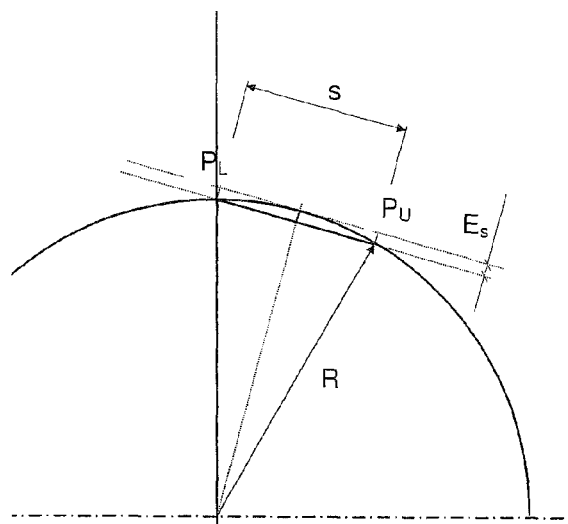
FIG. 7a illustrates a first option to incline a wire electrode relative to a pre-programmed machining path in accordance with an embodiment, wherein an upper intersection point and a lower intersection point of the wire electrode with the top and bottom surface of the workpiece, respectively, lies on the machining path.

According to a first option of the smoothing method the points $P_U$ and $P_L$ are on the machining path (FIGS. 6, 7a). In this case the displacement s represents a chord in a curved path section. The largest shape error corresponds to the sagitta at the midpoint $P_m$ between $P_U$ and $P_L$. In this case the permitted displacement s to set so as be within the maximum permitted shape error is computed as follows:

$$(s/2)^2=R^2-(R-E_s)^2 \rightarrow s=2*\sqrt{(2*R*E_s-E_s^2)}$$

Figure 7B:
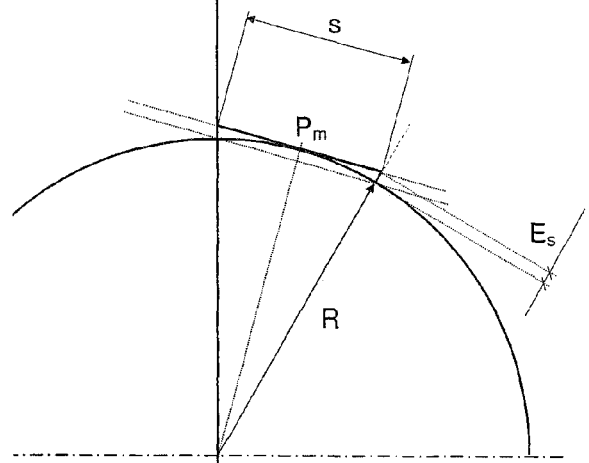
FIG. 7b illustrates a second option to incline a wire electrode relative to a pre-programmed machining path in accordance with an embodiment; wherein a midpoint of the wire electrode running through the workpiece lies on the machining path.

According to a second option a midpoint $P_m$ between the upper point $P_U$ and a lower point $P_L$ is on the machining path (FIG. 7b). In this case the displacement s is tangent to the machining path and the largest shape error is expected at the extremities of the displacements s, i.e. at $P_U$ and $P_L$. In this case the permitted displacement s to set so as be within the maximum permitted shape error is computed as follows:

$$(s/2)^2=(R+E_s)^2-R^2 \rightarrow s=2*\sqrt{(2*R*E_s-E_s^2)}$$

Figure 7C:
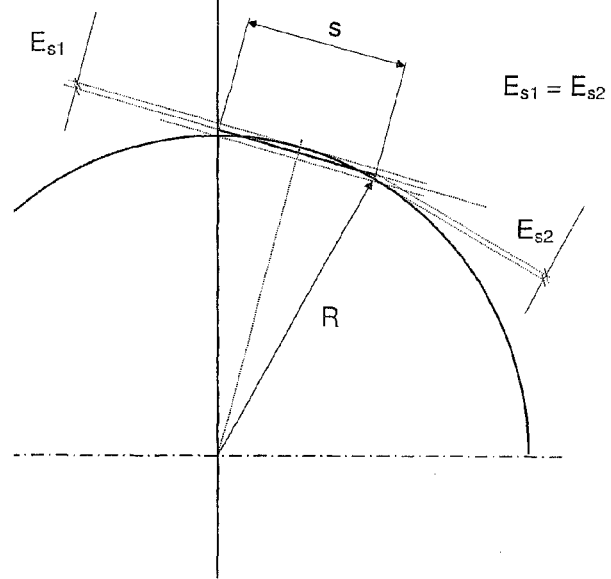
FIG. 7c illustrates a third option to incline a wire electrode relative to a pre-programmed machining path in accordance with an embodiment; wherein the inclination of the wire electrodes lies in between the two extremes of FIGS. 7a and 7b.

According to a third option, neither the extremities $P_U$ and $P_L$ nor the midpoint $P_m$ are on the programmed machining path, instead the inclination of the wire relative to the programmed machining path is such that the shape error at the extremities and at the midpoint are equal (FIG. 7c). In this manner the programmed machining path is matched at best. Here the permitted displacement s to set so as to be within the maximum permitted shape error is computed as follows:

$$(s/2)^2=(R+E_s)^2-(R-E_s)^2 \rightarrow s=2*\sqrt{(4*R*E_s)}=4*\sqrt{(R*E_s)}$$

The displacement s computed according the first and the second option is nearly the same, because $E_s^2 \ll 2*R*E_s$. The displacement s computed according the third option is about $\sqrt{2}$ times larger than according the first and second option. In other words, the same displacement s causes a smaller shape error since the error is evenly distributed on both sides of the nominal machining path.

One of the above or other options on how to tilt the wire relative to the programmed machining may be selected by the user or automatically set by the control unit as a function of the actual machining. In case of coupled die components, punch and die are produced such as to avoid interference. For instance, all outer curves are produced according the first option and inner curves are produced according the second option, such as to be on the safe side.

Figure 5:
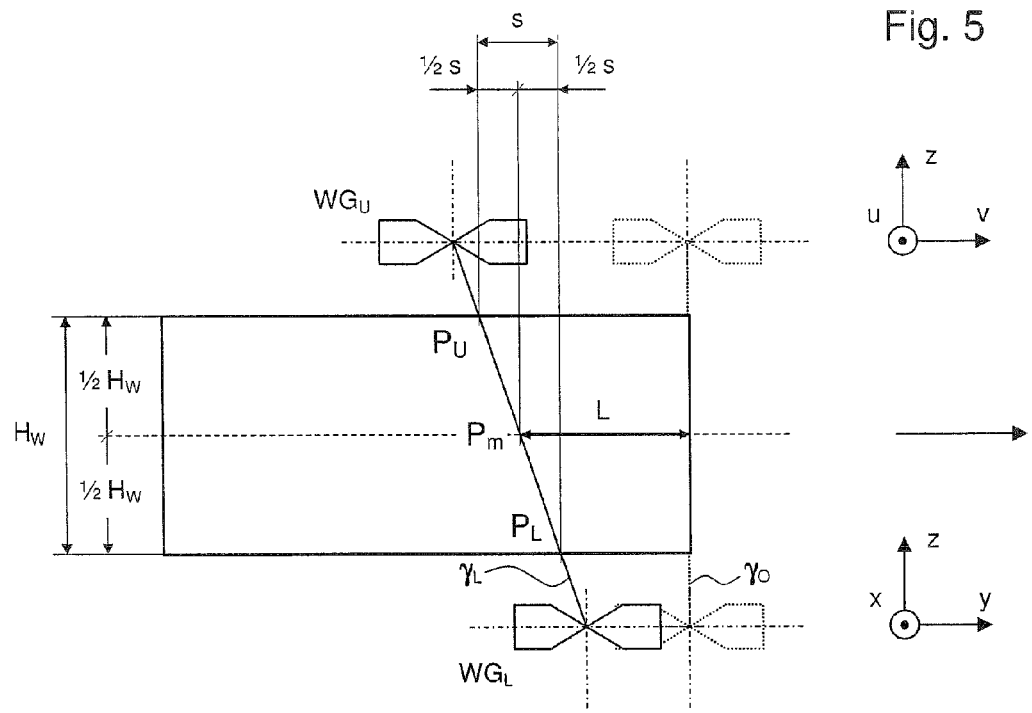
FIG. 5 illustrates an inclination of a wire guide and the resulting displacement of an upper and a lower wire guide.

As Illustrated in FIG. 5 the displacement s is divided in two equal parts, wherein $P_U$ anticipates $P_m$ by ½ s and $P_L$ lags ½ s behind $P_m$, or vice versa. Since the distance of the upper wire guide $WG_A$ from the top of the workpiece and the distance of the lower wire guide $WG_L$ from the bottom of the workpiece are generally the same, the midpoint $P_m$ is at half of the workpiece height $H_w$.

In the following the description refers essentially to an embodiment using the second of the options described above, i.e. with a midpoint $P_m$ of the displacement s matching with the programmed machining path (FIG. 5 and FIG. 7b).

Figure 8:
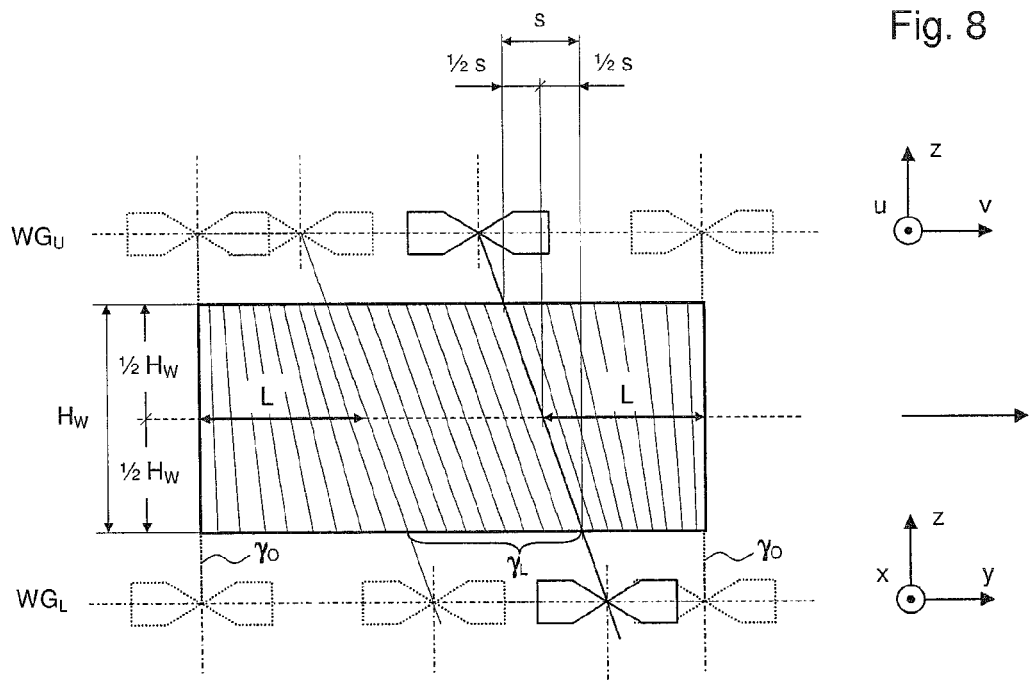
FIG. 8 illustrating a variation of the inclination of the wire electrode in an end section of a geometry element of the contour to be cut.
Figure 9:
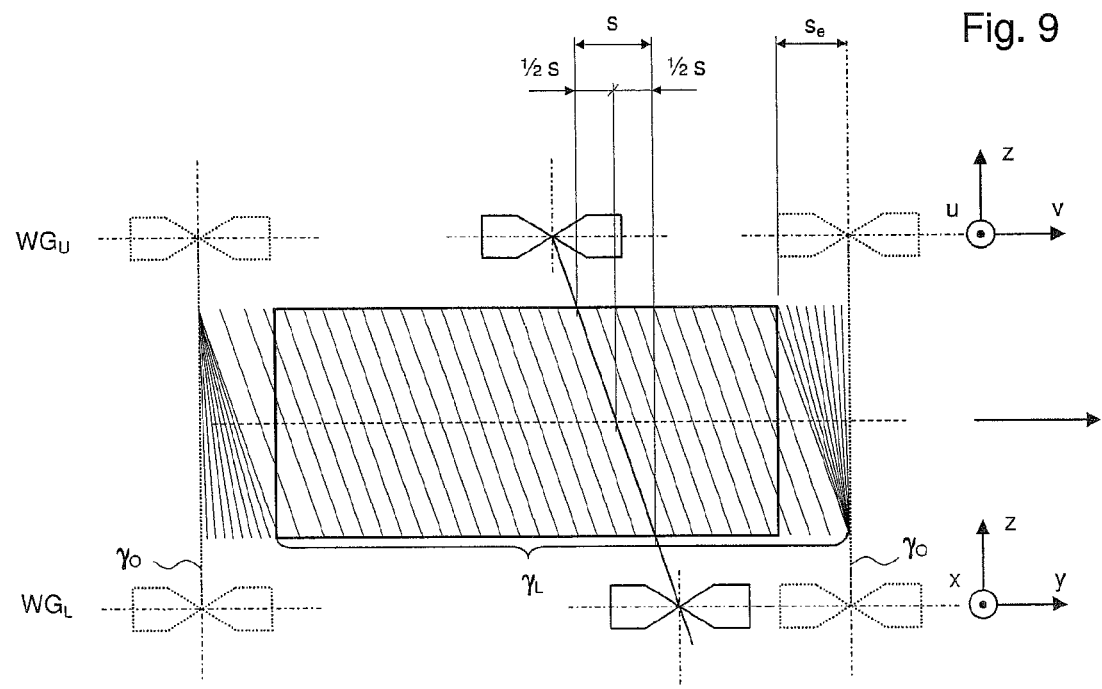
FIG. 9 illustrates the variation of the inclination of the wire electrode after leaving the machining path.

As illustrated above, in some embodiments, the wire has to be redressed in view of corners and arc section having large curvature. However the surface smoothing method may be combined with a particular corner strategy, wherein the machining path is selectively modified in positive corners by inserting, for instance, a circular arc movement as suggested, e.g. In JP59-115125, or by inserting a loop adjacent the machining path or by moving the wire away from the machining path. Instead of redressing on the machining path as shown in FIG. 8, the wire leaves the original machining path in one or more loops, as shown in FIGS. 9 and 11b-11d, so that one or more successive geometry elements can be processed with the maximum tilt angle $\gamma$ allowable in the specific section. In this way it is possible to produce sharp corners with minimal shape error and in the same time maintain the wire inclination so as to achieve good surface smoothing. In the inserted section of the machining path, the shape accuracy is not relevant so that the wire can be tilted and redressed arbitrarily.

Figure 11A:
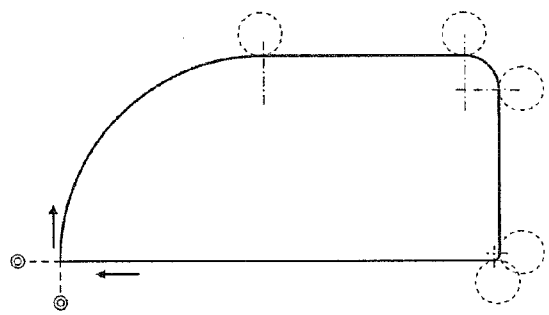
FIG. 11a illustrates the contour of FIG. 10 and circular arc movements at the transition between geometry elements.
Figures 11B, 11C, 11D:
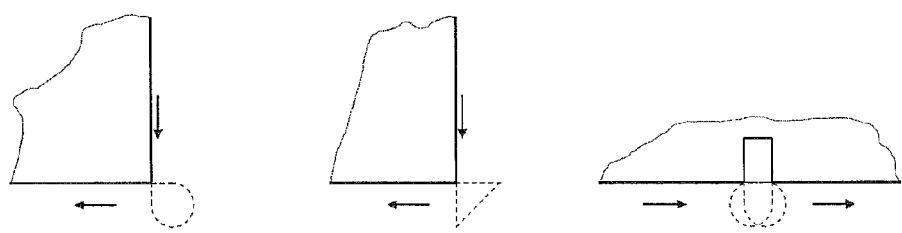
FIGS. 11b to 11d illustrate various loop-movements at the transition between geometry elements.

The method can also be used systematically at each transition point of geometry elements having different curvature. For instance, it is possible to add a circular arc movement between a straight section and a curved section, as shown in FIG. 11a. The required tilt angle γ is set in the circular arc section. In this way it is possible to apply a constant maximum displacement $s_{Emax}$ over the whole length of each geometry element.

Since it is not always possible to apply the above "trick", the inclination of the wire is controlled within the geometry elements in some embodiments. In some embodiments, this is probably a delicate aspect of the present surface smoothing method, in particular because the upper and lower wire guide move at different speed to change the inclination of the wire. Thus, at least one parameter indicating how to change the inclination of the wire is required in such embodiments. One possibility is to define the distance L between γ=0 and $γ_{Smax}$ and vice versa, as illustrated in FIG. 8. The inclination or redressing "speed" can be defined by introducing a tilt angle variation coefficient Kγ, representing the ratio between the maximum displacement $s_{Kmax}$ and the distance L. In this way the distance L is proportional to the displacement $s_{Kmax}$ to be set.

$$Kγ = s_{Kmax}/L \rightarrow L = s_{Kmax}/Kγ$$

The value of Kγ is stored, e.g. in a memory of the control unit. A typical value of Kγ may 0.2, so that, f.i., in the case of a maximum displacement $s_{Kmax}$=100 μm the wire inclination or redressing is completed at L=500 μm.

The following embodiment illustrates how the displacement s is computed with a specific machining geometry. The embodiment of FIG. 10 refers to the machining of a die composed of 6 geometry elements. The WEDM operation comprises a main and two trim cuts, whereas the trim cuts are executed with the present surface smoothing method.

The workpiece height $H_w$ is 18 mm and the maximum tilt angle $γ_{Smax}$ is 1°. The maximum permissible shape error $E_{Smax}$ is 1 μm and the minimum smoothing radius $R_{Smin}$ is 400 μm. The tilt angle variation coefficient Kγ is 0.2.

| Geometry element | 1 | 2 | 3 | 4 | 5 | 6 |
|---|---|---|---|---|---|---|
| Radius | 3 | ∞ | 0.5 | ∞ | 0.1 | ∞ |
| Angle | 90° | — | 90° | — | 90° | — |
| Length [mm] | 4.712 | 3 | 0.785 | 2.4 | 0.157 | 6.4 |

Figure 12A:
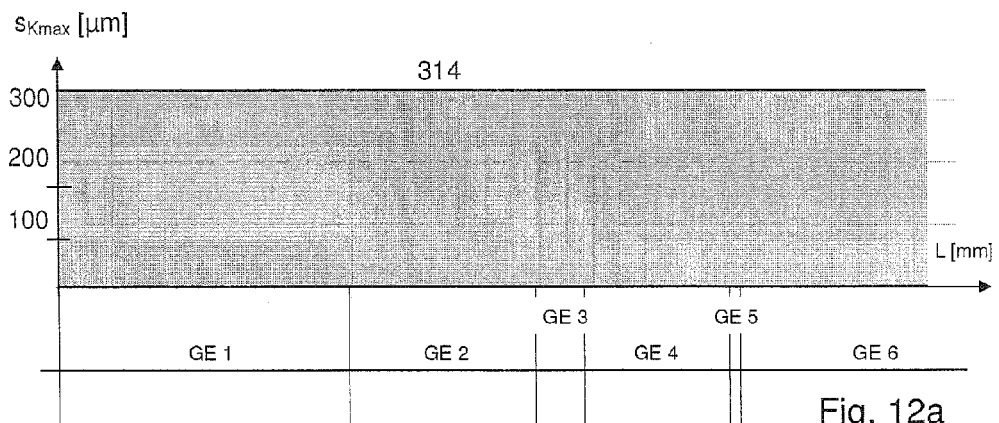
FIGS. 12a to 12d explain the computation of the displacement s in more detail.
Figure 12B:
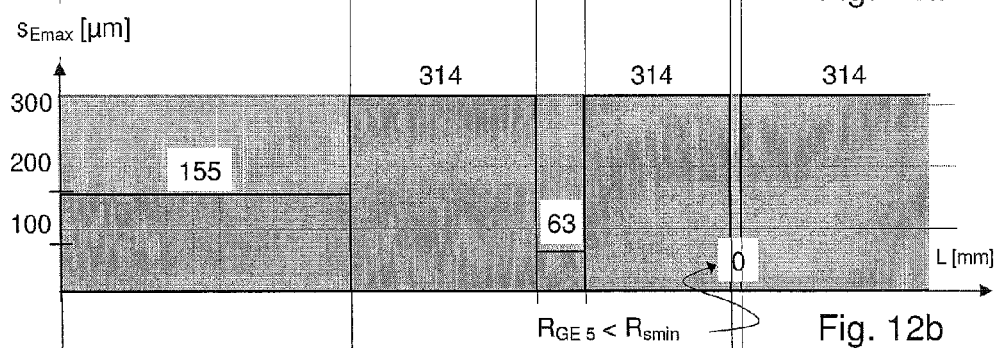
Figure 12C:
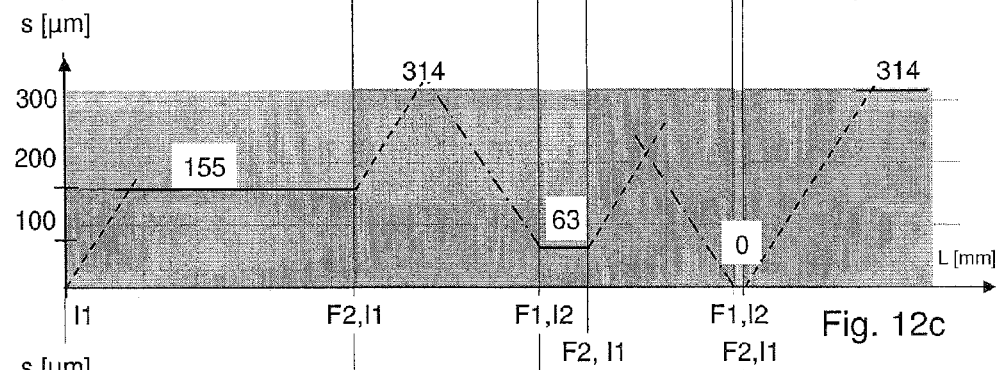

To achieve the desired shape accuracy in this embodiment, at least the following main rules must apply:

The displacement s is to be lower than or equal to the maximum displacement $s_{Emax}$ of each geometry element (FIG. 12b);

The displacement s at the end of the current geometry element $GE_n$ is to be lower than or equal the maximum displacement $s_{Emax}$ of the successive geometry element $GE_{(n+1)}$ (FIG. 12c, case F1, dash-dotted lines). To comply with this rule the displacement s must be reduced early enough, always considering the inclination/redressing "speed";

To fully exploit the smoothing method the following additional rules can be adopted at the transition of adjacent geometry elements:

At the begin of the current geometry element $GE_n$: If the displacement s at the end of the preceding geometry element $GE_{(n-1)}$, is smaller than the displacement s at the beginning of the current geometry element $GE_n$, then strive towards the maximum displacement $s_{Emax}$ of the current geometry element $GE_{(n+1)}$, (FIG. 12c, case I1);

At the beginning of the current geometry element $GE_n$: If the displacement s at the end of the preceding geometry element $GE_{(n-1)}$, is greater than or equal to the displacement s at the begin of the current geometry element $GE_n$, then displacement s of the current geometry element $GE_{(n+1)}$, is unaffected (FIG. 12c, case I2, dashed lines);

At the end of the current geometry element $GE_n$: If the displacement s at the begin of the successive geometry element $GE_{(n+1)}$ is greater than the displacement s at the end of the current geometry element $GE_n$, then displacement s of the current geometry element $GE_{(n+1)}$ is unaffected (FIG. 12c, case F2);

Referring to FIG. 12a-12d the computation of the displacement s in this embodiment will now be explained in more detail:

First, the displacement s is limited by the maximum tilt angle. $γ_{Smax}$ has been set to 1°, so that the maximum displacement $s_{Kmax}$ is 314 μm (FIG. 12a).

Parenthesis: Except for the boundary conditions discussed above (rules), the maximum displacement $s_{Kmax}$ applies for all straight sections and all arc sectors having a radius≧transition radius $R_{Smax}$, i.e. the radius at which the maximum displacement $s_{Kmax}$ causes the maximum permissible shape error $E_{smax}$.

The transition radius $R_{Smax}$ is derived as follows:

$$s = 2*\sqrt{(2*R*E_s + E_s^2)} \text{ with } E_s = E_{smax} \text{ and } s = s_{Kmax}$$

$$\rightarrow R_{Smax} = ((\tfrac{1}{2}s_{Kmax})^2 - E_{smax}^2)/(2*E_{smax})$$

Thus, with the present example the transition radius $R_{Smax}$ is 12.324 mm. For all radii R≧$R_{Smax}$ the displacement s=$s_{Kmax}$), causes a shape error $E_s$≦1 μm, whereas for all radii R<$R_{Smax}$ the displacement s is limited such as to produce a shape error $E_s = E_{smax}$=1 μm.

Second, the displacement s is limited by the curvature of each geometry element. (FIG. 12b). The maximum displacement $s_{Emax}$ for each geometry element GE is computed as follows:

$$s = 2*\sqrt{(2*R*E_s + E_s^2)} \text{ with } R=\text{Radius of GE including offset value}$$

$$s_{Emax} = 2*\sqrt{(2*R_E*E_s + E_s^2)}$$

Figure 10:
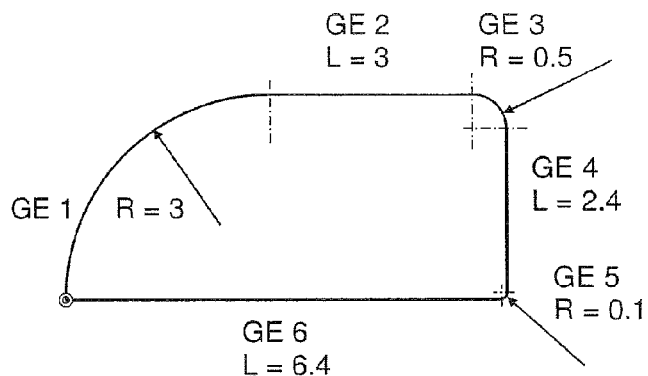
FIG. 10 illustrates a contour with six geometry elements.

Third, the minimum smoothing radius $R_{Smin}$ has to be observed. In the embodiment of FIG. 10 the surface smoothing method applies for all arc sectors having a radius ≧0.4 mm, thus for all geometry elements except for geometry element 5, because the radius is below $R_{Smin}$. Thus, the wire is not tilted in this section of the machining path.

| Geometry element | 1 | 2 | 3 | 4 | 5 | 6 |
|---|---|---|---|---|---|---|
| $s_{Emax}$ [μm] | 155 | $s_{Kmax}$ | 63 | $s_{Kmax}$ | 0 | $s_{Kmax}$ |

Figure 12D:
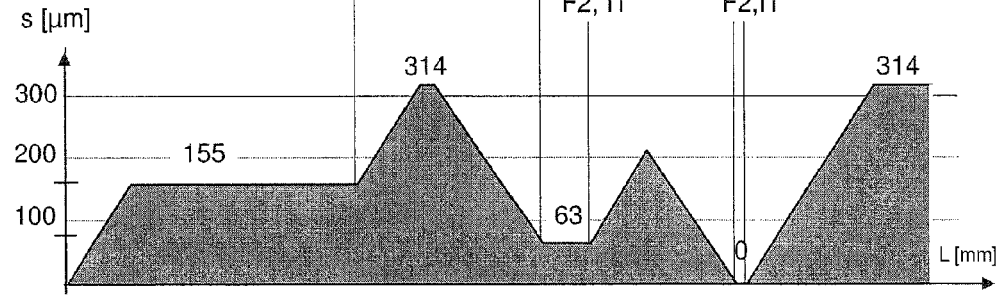

Fourth, the displacement s at the end of each geometry element is reduced to the displacement s allowed at the beginning of the next geometry element (FIG. 12c, dash-dotted lines), and fifth, the displacement s at the beginning of each geometry element is increased to the boundary set by the preceding limitations (FIG. 12c, dashed lines). FIG. 12d shows the complete boundary of the displacement s to be set in function of the position on the machining path.

Figure 13A:
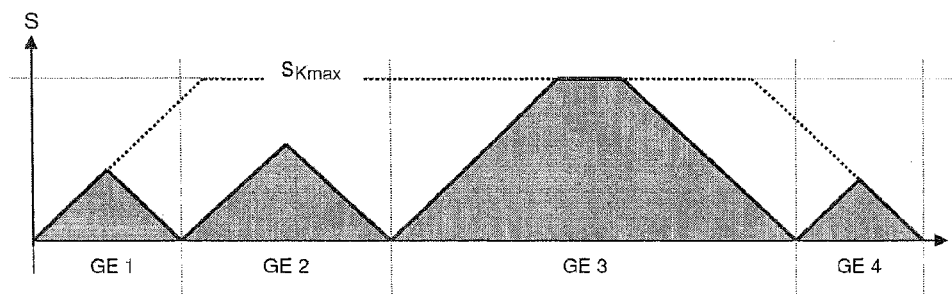
FIG. 13a illustrates to redress the inclination of the wire electrode at each transition between two geometry elements.
Figure 13B:
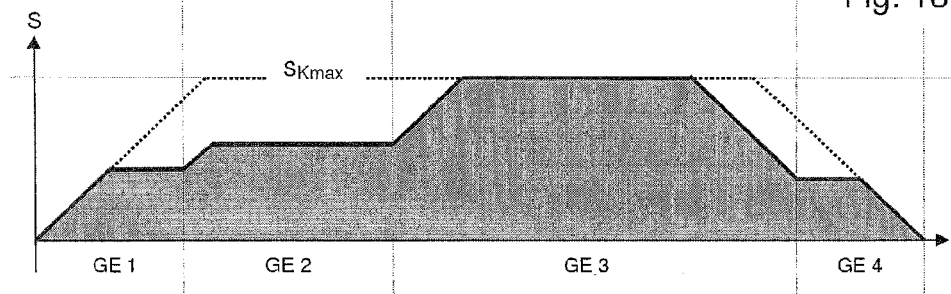
FIG. 13b illustrates a method in accordance with an embodiment, wherein the displacement is set for each geometry element to a maximal displacement.
Figure 13C:
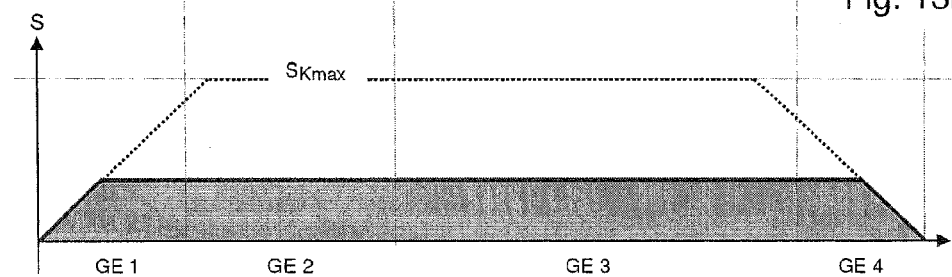
FIG. 13c illustrates a method in accordance with an embodiment, wherein the displacement is set to the minimal displacement of a geometry element.

There exist other embodiments to control the inclination of the wire or the displacement s in a sequence of geometric elements. For instance, the wire is always redressed at the transition from one geometry element to another, as shown in FIG. 13a. Alternatively, it is possible to choose the displacement s in function of the smallest maximum displacement $s_{Emax}$, such that the wire is maintained at the same inclination within several geometry elements, as illustrated in FIG. 13c. This solution is particularly suitable with geometries having few sharp corners and few arc sections with radius below $R_{Smin}$. The disadvantage of this solution is that the wire tilt angle is not optimal, but compared with the conventional art the machining result is improved and the surface may result even more homogeneous. For comparison, the above-explained smoothing method is shown in a corresponding FIG. 13b.

As explained earlier, by keeping the wire tilted in the cutting direction within a curved section, the vertical shape of the workpiece becomes concave in outer curves and convex in inner curves, respectively.

As known, the position of the wire during the WEDM process is influenced by attractive and repulsive forces, so that wire deflection occurs (see f.i. CH 591 919, EP 0 963 272). Attractive and repulsive forces are influenced by machining parameters, such as ignition voltage, discharge current, pulse pause, ignition delay time, working gap distance, etc.

Thus, in some embodiments it is possible to compensate at least a part of the error caused by the present surface smoothing method by changing one or more of the above machining parameters in curved sections. In particular, it is possible to change the machining parameters within a geometry element as a function of the expected shape error.

Figure 14:
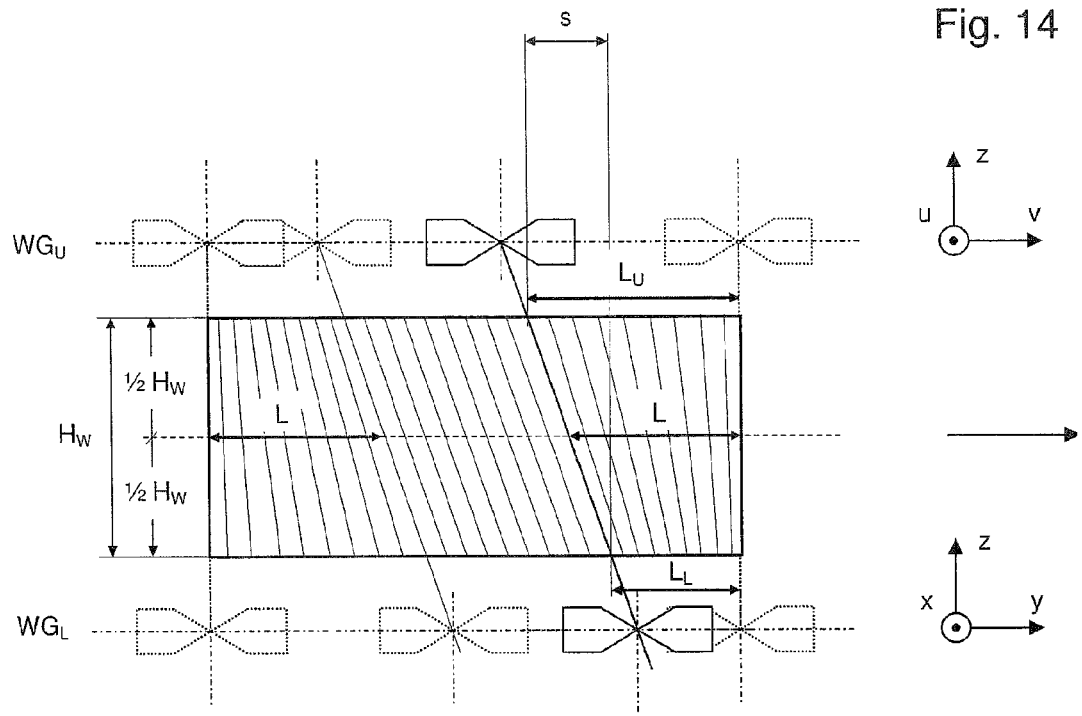
FIG. 14 illustrates the process of inclining the wire electrode by moving the upper and lower wire guide at different speed over a certain distance.
Figure 15:
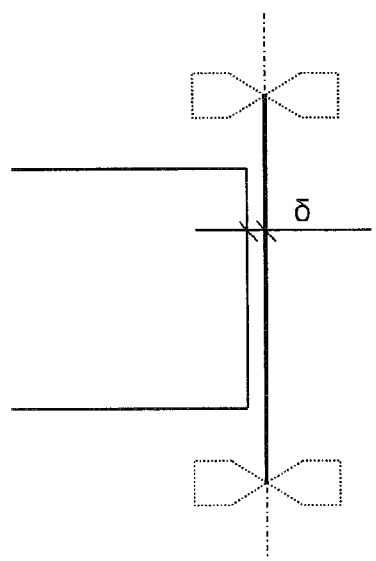
FIG. 15 shows a working gap distance.

As illustrated in FIG. 14, the upper and lower wire guides are moved at different speeds over a certain distance to tilt the wire in the cutting direction. Thus, the machining speeds at the upper and the lower surface of the workpiece are different. This implies that a larger quantity of workpiece material is removed where the wire moves slower and vice versa. In other words, the working gap distance over the height is proportional to the machining speed, as shown in FIG. 15.

Figure 16:
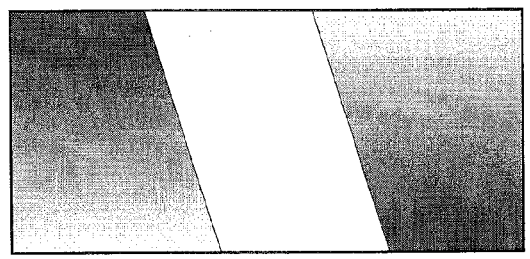
FIG. 16 illustrates an overcut.

Besides the slightly excessive removal of material, the change of the tilt angle in wire cutting direction may cause a ridge at the transition point, extending over a part of the workpiece height. In FIG. 16, the shaded areas illustrate regions of excessive removal of material, i.e. overcut.

To narrow said error, in some embodiments the maximum tilt angle is limited to comparably small values and the inclination distance L is set long enough (respectively the tilt angle variation coefficient Kγ should be comparably small).

As further measure, some embodiments comprise a compensation algorithm, in which the wire path is changed so as to avoid overcut and undercut, respectively, in the region of changing wire tilt angle. In these regions overcut and undercut are estimated, f.i. by considering the machining distances $L_U$ at the upper surface and $L_L$ at lower surface, respectively, in relation with the machining distance $L_m$ at half workpiece height. In practice, this means that the wire is inclined laterally, i.e. normal to the cutting direction, to compensate the error induced by the change of the inclination of the wire in the cutting direction. A similar method to improve the accuracy in taper machining is known, for example, from EP 1 769 871.

In some embodiments, the control unit provides default values of the setting parameters used by the surface smoothing method to compute the displacement s, and ultimately the path of the upper and lower wire guides. Default values include for instance a maximum permissible shape error $E_{smax}$, a maximum tilt angle $\gamma_{Smax}$ or a maximum displacement $s_{Kmax}$, a minimum smoothing radius $R_{Smin}$, a tilt angle variation coefficient Kγ, etc. The default values can be changed by the user for a specific application. In some embodiments, the default values are automatically identified by the control unit by adopting specific algorithms, considering the specific parameters of the current machining, f.i. typology of the geometry (e.g. from structured to plane), the expected accuracy, the thickness of the workpiece, etc.

In some embodiments, the present invention is also be used to improve the quality of the whole machining surface of a workpiece. However, the surface smoothing method does not need to be activated over the whole machining path in some embodiments, but may be applied to a limited section thereof, for instance to eliminate a ridge in the region of an entry cut, to improve the quality of a functional surface, or the like.

The surface smoothing method embodiments have been described in relation with a so called cylindrical cut, i.e. where the cutting operation is perpendicular to the X/Y plane. The skilled person may appreciate that the present invention may also be used with taper cutting operations or other suitable wire electric discharge machining operations.

| List of reference signs | |
|---|---|
| Tilt angle in wire cutting direction | γ |
| Maximum tilt angle | $\gamma_{Smax}$ |
| Displacement | s |
| Maximum displacement | $s_{max}$ |
| Maximum displacement of a geometry element | $s_{Emax}$ |
| Maximum displacement with maximum tilt angle | $s_{Kmax}$ |
| Inclination distance | L |
| Shape error caused by the displacement s | $E_s$ |
| Maximum shape error | $E_{smax}$ |
| Maximum contour error | $E_{kmax}$ |
| Tilt angle variation coefficient | Kγ |
| Workpiece height | $H_W$ |
| Radius of a curved geometry element | R |
| Minimum smoothing radius | $R_{Smin}$ |
| Transition radius | $R_{Smax}$ |
| Curvature of a curved geometry element | K |
| Upper wire guide | $WG_U$ |
| Lower wire guide | $WG_L$ |
| Point on the upper surface of the workpiece | $P_U$ |
| Point on the lower surface of the workpiece | $P_L$ |
| Midpoint between $P_U$ and $P_L$ | $P_m$ |
| Workpiece | 1 |
| Cutting work | 2 |
| Wire electrode | 4 |
| Lower arm | 6 |
| Upper arm | 7 |
| X-Y cross table | 8 |
| U-V cross table | 9 |
| Work holder | 10 |
| Upper wire guide | 11 |
| Lower wire guide | 12 |
| Upper photodetector | 14 |
| Lower photodetector | 15 |

The invention claimed is:

1. A method for controlling a wire electric discharge machine comprising the steps of:
    determining of at least one predefined contour deviation ($E_{smax}$) of a predefined contour to be cut into the workpiece;
    determining a curvature of at least one geometry element defining at least one section of the contour to be cut into the workpiece;
    calculating a displacement (s) of an upper guide ($WG_U$) and a lower wire guide ($WG_L$) based on the predefined contour deviation ($E_{smax}$) and on the curvature of the at least one predefined geometry element; and
    setting the displacement (s) by moving the upper guide ($WG_U$) relative to the lower wire guide ($WG_L$) such that the wire electrode guided by the upper ($WG_U$) and lower wire guides ($WG_L$) is inclined in a current cutting direction of the workpiece during cutting of the geometry element into the workpiece.

2. The method according to claim 1, further comprising the step of comparing the calculated displacement (s) with a predefined maximal displacement ($s_{max}$) and setting the displacement (s) to the maximal displacement ($s_{max}$), in the case that the calculated displacement (s) is greater than the maximal displacement ($s_{max}$).

3. The method according to claim 1, further comprising the step of calculating a maximal displacement ($s_{Emax}$) for a current geometry element, based on the predefined contour deviation ($E_{smax}$) and the curvature of the current geometry element.

4. The method according to claim 3, wherein the displacement (s) is calculated for an end section of the current geometry element and the displacement (s) does not exceed the maximal displacement ($s_{Emax}$) for the following geometry element.

5. The method according to claim 4, wherein the displacement (s) is continuously reduced, in an end section of the geometry element, to the maximal displacement ($s_{Emax}$) for the following geometry element, in the case that the maximal displacement ($s_{Emax}$) for the current geometry element exceeds the maximal displacement ($s_{Emax}$) for the following geometry element.

6. The method according to claim 3, wherein the displacement (s) is reduced to zero at the end of each geometry element.

7. The method according to claim 3, wherein the displacement (s) is set to the smallest maximal displacement ($s_{Emax}$) of at least two adjacent geometry element for the at least two adjacent geometry elements.

8. The method according to claim 1, wherein the displacement (s) for the beginning of the current geometry element is continuously increased to the maximal displacement ($s_{Emax}$) for the current geometry element.

9. The method according to claim 1, wherein the displacement (s) is continuously reduced to zero, in the case that the radius of curvature of a following geometry element is equal to or lower than a predefined minimal radius of curvature ($R_{smin}$) or in the case that the transition of the current geometry element to the following geometry element comprises a corner element.

10. The method according to claim 1, further comprising the step of inserting at least one loop-movement in the transition of a current geometry element to a following geometry element and adjusting, during the loop movement, the displacement (s) for the following geometry element.

11. The method according to claim 1, wherein the wire electrode cutting the contour into the workpiece builds an upper contour point ($P_U$) on the upper surface of the workpiece and a lower contour point ($P_L$) on the lower surface of the workpiece, and wherein each variation of the displacement (s) is adjusted by at least one of slowing and stopping of the velocity of the upper contour point ($P_U$) and/or the lower contour point ($P_L$).

12. The method according to claim 1, wherein the direction of inclination of the wire electrode is reversed for successive cuts of the workpiece.

13. A wire electric discharge machining apparatus, comprising:
a controller for controlling the cutting of a contour comprising at least one geometry element into a workpiece;
a wire electrode; and
an upper wire guide and a lower wire guide for guiding the wire electrode, the upper wire guide and the lower wire guide being controllable by the controller; wherein the controller is adapted to perform the method according to claims 1.

* * * * *

UNITED STATES PATENT AND TRADEMARK OFFICE
CERTIFICATE OF CORRECTION

| | |
|---|---|
| PATENT NO. | : 8,242,403 B2 |
| APPLICATION NO. | : 12/688245 |
| DATED | : August 14, 2012 |
| INVENTOR(S) | : Stefano Angelella, Ponte Mazzolini and Stefano Candolfi |

It is certified that error appears in the above-identified patent and that said Letters Patent is hereby corrected as shown below:

In the Specification

Column 1, line 23, after "according" insert --to--.

Column 1, line 32, "behenceforth" should be --be henceforth--.

Column 1, line 48, "at a" should be --at an--.

Column 2, line 12, "disclosure" should be --disclose--.

Column 2, line 15, "implement" should be --implemented--.

Column 3, line 19, "illustrating" should be --illustrates--.

Column 4, line 32, "a additional" should be --an additional--.

Column 4, line 40, "A t" should be --At--.

Column 7, line 47, "hold" should be --held--.

Column 7, line 51, "an lower" should be --a lower--.

Column 10, line 6, "so as be" should be --so as to be--.

Column 10, line 22, after "according" insert --to--.

Column 10, line 23, after "according" insert --to--.

Column 10, line 32, after "according" insert --to--.

Column 10, line 33, after "according" insert --to--.

Column 10, line 38, "$WG_A$" should be --$WG_U$--.

Signed and Sealed this
Fourth Day of June, 2013

Teresa Stanek Rea
*Acting Director of the United States Patent and Trademark Office*

CERTIFICATE OF CORRECTION (continued)
U.S. Pat. No. 8,242,403 B2

Column 11, line 24, after "may" insert --be--.

Column 11, line 60, "At the begin" should be --At the beginning--.

Column 12, line 2, "At the begin" should be --At the beginning--.

Column 12, line 6, "At the begin" should be --At the beginning--.

Column 12, line 11, "FIG. 12a-12d" should be --FIGS. 12a-12d--.

Column 14, line 5, after "also" insert --to--.

In the Claims

Column 16, line 5, claim 9, "($R_{smin}$)" should be --($R_{Smin}$)--.

Column 16, line 11, claim 10, "loop movement" should be --loop-movement--.

Column 16, line 33, claim 13, "claims 1" should be --claim 1--.